United States Patent [19]

Minks

[11] 3,740,589

[45] June 19, 1973

[54] BLOCKING OSCILLATOR WITH CURRENT MODE TRANSFORMER

[76] Inventor: Floyd M. Minks, Route 1, Box 41, Kissimme, Fla. 32741

[22] Filed: Feb. 16, 1971

[21] Appl. No.: 115,652

[52] U.S. Cl.......... 307/275, 123/148, 315/209 CD, 320/1, 331/112
[51] Int. Cl. .............................................. H03k 3/30
[58] Field of Search .................... 307/275; 331/112; 328/65, 67

[56] References Cited
UNITED STATES PATENTS

| | | | |
|---|---|---|---|
| 3,295,041 | 12/1966 | Bize | 331/112 X |
| 3,573,596 | 4/1971 | Kamil et al. | 331/112 X |
| 3,427,525 | 2/1969 | Thornwall | 331/112 X |
| 3,200,261 | 8/1965 | Fischman et al. | 307/275 X |
| 3,299,369 | 1/1967 | Vercellotti et al. | 331/112 |
| 3,379,897 | 4/1968 | Kaminski | 307/275 X |
| 3,491,281 | 1/1970 | Penn | 331/112 X |

Primary Examiner—Stanley D. Miller, Jr.
Attorney—Robert C. Anderegg

[57] ABSTRACT

A blocking oscillator of free running or triggered input type includes a non-saturable current transformer connected in series with a transistor and a storage inductor to provide a feedback signal with means independent and separate from the transformer initiating and terminating the charging cycle. The storage inductor may be provided with a special current feedback sensing winding paralleled with a resistor and capacitor to fire a control rectifier connected directly across the input circuit of the transistor. The capacitor may be discharged to a variable reference and provide an adjustable control. The sensing circuit can include a saturable winding in series with a resistor. A series sensing resistor can also be connected in the charging circuit to fire a control rectifier to divert the power from the current transformer and thereby turn off the charging transistor.

15 Claims, 4 Drawing Figures

Patented June 19, 1973
3,740,589
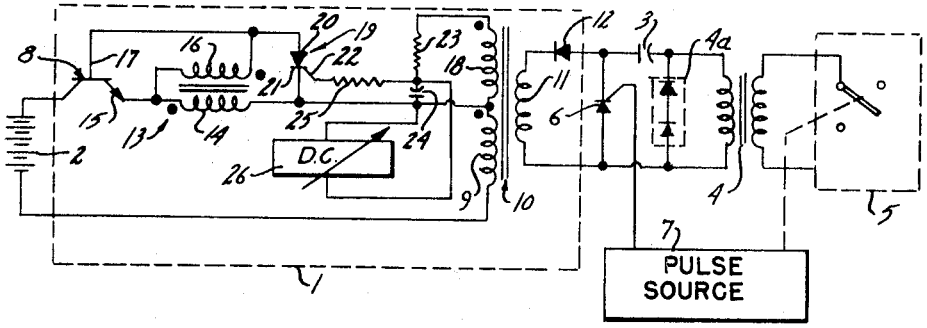
FIG_1
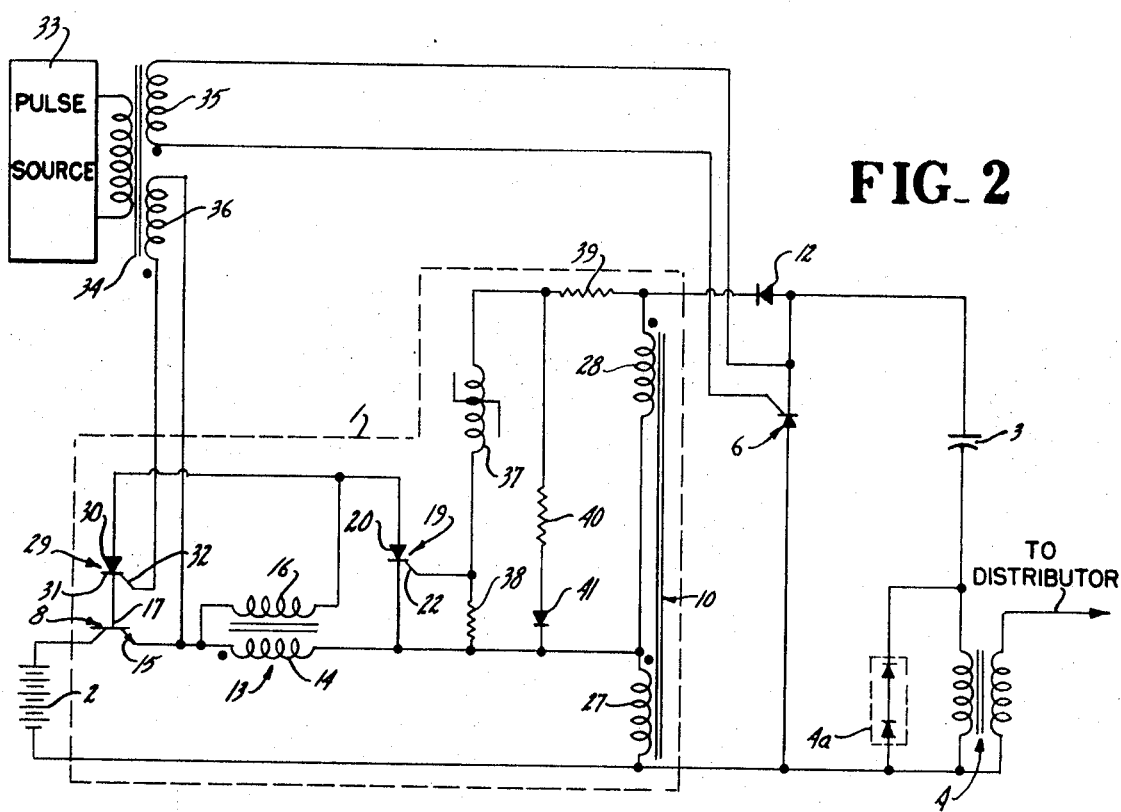
FIG_2
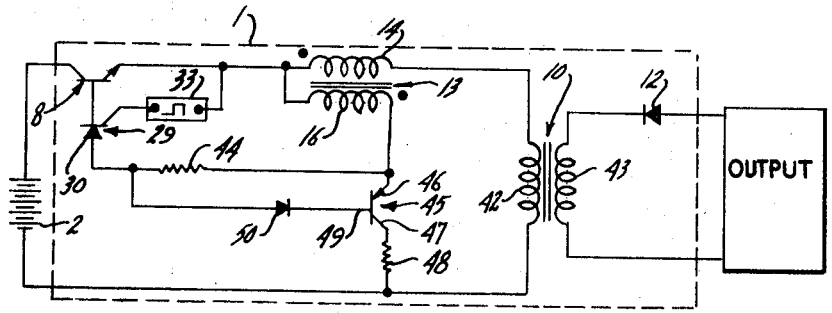
FIG_3
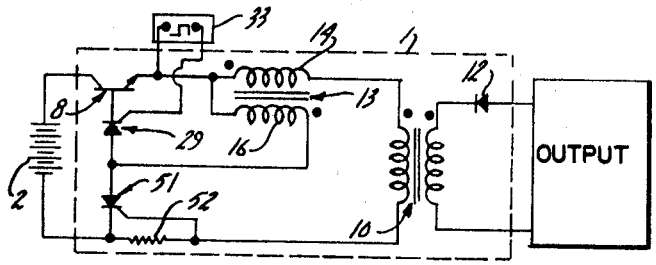
FIG_4
INVENTOR.
FLOYD M. MINKS
BY
ATTORNEYS

BLOCKING OSCILLATOR WITH CURRENT MODE TRANSFORMER

BACKGROUND OF THE INVENTION

This invention relates to a blocking oscillator and particularly to an improved blocking oscillator in a capacitor discharge system for charging the capacitor to a selected level.

Capacitor discharge systems have recently been developed for operating of ignition systems for internal combustion engines and the like. Generally, in such systems a capacitor is connected to the battery through a charging circuit to rapidly charge the capacitor to an appropriate voltage level for firing of a spark plug. The capacitor is discharged through a control rectifier or similar device at an appropriate time to transfer the stored energy to the spark plug and thereby fire the internal combustion engine. A highly satisfactory capacitor discharge ignition system is shown, for example, in applicant's U.S. Pat. No. 3,502,955, which issued Mar. 24, 1970 and is entitled "Pulse Forming Circuit And Capacitor Discharge Ignition System Therewith." As disclosed in such patent, capacitor charging is provided by a blocking oscillator wherein the energy from the battery is first stored in an oscillator inductor core having a winding connected in series with a transistor to the battery. The stored energy is transferred to the capacitor during the normally non-conducting period of the oscillator transistor. Although highly satisfactory blocking oscillator systems have been developed there is a need for a relatively simple and reliable circuit for capacitor discharging systems and the like.

SUMMARY OF THE INVENTION

The present invention is particularly directed to a blocking oscillator circuit employing the usual storage inductor or transformer in series with a charging control transistor with the conductivity of the transistor controlled in accordance with the teaching of the present invention by a separate current transformer connected between the transistor and the charging winding of the storage inductor. The blocking oscillator may be constructed to free run and cut off at a selected energy transfer level or may alternatively employ a turn on trigger control signal in combination with a separate energy related turn off control. In either event, the current transformer functions to maintain the necessary feedback signal with different means being provided for initiating and terminating the charging cycle.

In accordance with another aspect of the present invention the blocking oscillator charging cycle is terminated by sensing the output level of the energy storage level of the storage inductor and then by-passing and providing an essentially short circuit across the current transformer to terminate feedback. For example, the storage inductor may be provided with a special current feedback sensing winding providing a charging current level related signal to a control rectifier or other similar gated switch means. In one embodiment, a resistor in series with a capacitor is connected across the sensing winding with the junction of the resistor and the capacitor providing an appropriate voltage signal for triggering of a rapidly acting gated switch such as a controlled rectifier or the like which in turn is connected directly across the input circuit of the control or charging transistor. In such a circuit, a control input can be connected across the turn off capacitor to by-pass or discharge the capacitor; thereby turning off the controlled rectifier and allowing the blocking oscillator to reinitiate a cycle under noise conditions or the result of noise or the like. The control input can also control the level to which the control transistor is discharged and thus provide a suitable adjustable control if desired.

Alternatively, a cut off sensing circuit can include a saturable winding in series with a resistor with the gate of the trigger means connected to the junction of the saturable winding and the resistor.

Further, a control rectifier may be connected in series in the input circuit of the charging transistor and an appropriate input signal applied to the control rectifier and the charging transistor to simultaneously bias the elements on and thereby initiate a charging cycle.

Alternatively, a series sensing resistor can be connected in the charging circuit and selectively trigger a control switch to divert the power from the current transformer and thereby turn off the charging transistor.

The current transformer means provides a simple and inexpensive feedback in an efficient system as the feedback circuit does not employ any dissipating elements.

BRIEF DESCRIPTION OF THE DRAWINGS

The drawings furnished herewith illustrate the best mode presently contemplated by the inventor in which the above advantages and features are clearly disclosed as well as others which will be readily understood from the following description of the illustrated embodiments of the invention.

In the drawing:

FIG. 1 is a schematic circuit diagram illustrating a free running blocking oscillator employing a current transformer feedback in accordance with the present invention and a separate control for terminating the charging cycle;

FIG. 2 is a schematic circuit similar to that shown in FIG. 1 illustrating a current mode operated triggered blocking oscillator with a current sensing means for terminating the charging cycle and a separate pulsed input for initiating a charging cycle;

FIG. 3 is a view similar to FIG. 2 illustrating a triggered blocking oscillator having a positive input control and a charging current turn off control; and FIG. 4 is a view similar to FIG. 3 showing an alternative current sensitive turn off means.

DESCRIPTION OF ILLUSTRATED EMBODIMENTS OF INVENTION

Referring to the drawing and particularly to FIG. 1 a blocking oscillator circuit or unit 1 constructed in accordance with the teaching of the present invention has an input interconnected to a battery 2 and an output interconnected to charge a capacitor 3. The capacitor or pulse transformer 4 couples the capacitor 3 to the distributor 5 of an internal combustion engine or the like for firing of the spark plugs in proper sequence. A silicon controlled rectifier 6 is shown connected in circuit with the capacitor 3 and the pulse transformer 4 for selective transfer or discharge of the capacitor 3 through the pulse transformer 4. A pulse source 7 is shown connected to the input or gate of the controlled rectifier. The pulse source is coupled to the distributor 5 to provide proper timed energization of the controlled rectifier 6 and discharge of the capacitor 3 for proper firing of the ignition system. The illustrated output circuitry interconnecting the capacitor into the spark plugs is generally similar to that more fully disclosed in applicant's previously identified issued patent and no further description thereof is given.

Turning particularly to the construction of the blocking oscillator, a charging control transistor 8 is connected in series with the charging winding 9 of an inductive energy storage inductor or transformer 10 across the battery 2. Thus, with the transistor 8 conducting as hereinafter described, current flows through the winding and results in the storage of energy in the core of the inductor 10. A separate output winding 11 is shown in the illustrated embodiment of the invention connected through a blocking diode 12 to charge the capacitor 3 in series with a parallel network including the primary of the pulse transformer 4 and a stabister 4a, generally, as shown in U.S. Pat. No. 3,502,955. During the energy charging cycle for storing of energy in the inductor 10, the polarity of windings 9 and 11 is shown by the polarity dots adjacent the upper ends of the windings. During the charging cycle the diode 12 is, of course, back biased and, consequently, the energy is stored in the core of the inductor 10. When transistor 8 is cut off, the polarity of the windings 9 and 11 reverse and the energy is transferred through the primary transformer 4 and the stabister 4a to charge the capacitor 3.

In accordance with the present invention and particularly the embodiment shown in FIG. 1, a current transformer 13 is connected between the transistor 8 and the winding 9 to provide a feedback signal to the transistor 8 to maintain conduction once it is initiated, as follows. The current transformer includes a sensing winding 14 connected in series between the emitter 15 of transistor 8 and the one side of winding 9. An output or a feedback secondary 16 of transformer 13 is connected between the emitter 15 and the base 17 of transistor 8. The windings 14 and 16 are wound in a ratio of essentially 1 to 6 to convert the current signal into an appropriate voltage driving signal for proper "on" biasing of the transistor 8. The transformer 13 is wound such that with the transistor 8 conducting the emitter connected end of winding 14 is positive while the opposite or base connected end of the winding 16 is at a relatively positive potential with respect to the emitter and thus provides a turn on voltage across the base to emitter junction. This will cause the conductivity of the transistor 8 to increase providing current supply to the inductor 10 with a related energy storage. Although it is possible to construct the current transformer to saturate and terminate the feedback signal and thereby end a cycle, or provide a selective number of current and turns ratio of transformer 13 such that the beta of the transistor 8, which is also current dependent, would be reached at a selected current and turns ratio to terminate a cycle, the illustrated embodiment of the invention provides a positive turn off means.

In the illustrated embodiment of the invention, the positive turn off circuit is provided with an energy level sensing winding 18 interconnected to control the firing of a controlled rectifier 19 which is connected in parallel with the secondary 16 of the current transformer 13 and the base to emitter circuit of the transistor 8. Thus, the anode 20 is connected to the common junction of the base 17 on one side of the secondary 16. The cathode in turn is connected to the output side of the transformer winding 14. Thus, when the rectifier 19 is fired to conduct it provides a direct short circuit across the base to emitter circuit and across the current transformer thereby shunting power from the transistor 8 and rapidly driving it to cut off. In the illustrated embodiment of the invention, the gate 22 of silicon control rectifier 19 is connected to the junction of a resistor 23 and a bias control capacitor 24 in series with a resistor 25. The resistor 23 and capacitor 24 are connected in series across the sensing winding 18 with the capacitor 24 connected across the gate to cathode junction of the control rectifier 19. The sensing winding 18 is wound to have a polarity indicated by the polarity dots related to the corresponding polarity of the winding 9. Thus, during the charging cycle the illustrated top side of the winding 18 is positive and serves as a current source with current flow through the resistor 23 and the capacitor 24. The capacitor 24 will charge to the firing voltage of the gate 22 of the control rectifier 19 and establish firing at a preselected level. The rectifier 19 then provides a cut off at a predetermined storage of energy within the core of the storage inductor 10. Upon cut off of the main transistor 8, as previously noted, the polarity of the several inductor windings reverse and the energy stored in the inductor will be transferred to and stored in the capacitor 3 for subsequent discharge to the ignition system.

A variable direct current source 26 may be connected across the capacitor 24 to provide a prebias or initial charge on the capacitor. Thus, by providing an initial reference voltage level in the capacitor 24 to which it is discharged upon triggering of the SCR a greater or lesser charge from the sensing winding 18 is required. This in turn permits adjustment of the particular energy stored in the inductor 10 and transferred to the capacitor 3 during each cycle.

In the operation of the illustrated embodiment of the invention shown in FIG. 1, the pulse source 7 is actuated in timed relationship to the operation of the distributor 5 of the internal combustion engine to provide for successive connection of the capacitor 3 to the several spark plugs. The blocking oscillator continuously operates with the initiation of a charging cycle resulting from the usual noise characteristics of a transistor 8 providing a turn on bias across the base to emitter circuit. Once current flow is initiated the current transformer 13 senses the current flow and provides a regenerative feedback action through the current to voltage conversion, with the secondary 16 establishing a turn on voltage positively driving the transistor 8 into saturation. The current thus increases through the inductor 10 and as it increases, a corresponding feedback signal is sensed by the winding 18 and applies a correspondingly charging current to the capacitor 24. When the capacitor 24 charges to the triggering level of the control rectifier, the rectifier 19 conducts and by-passes power from the feedback current transformer 13 thereby removing the signal from the transistor 8 and positively preventing conduction by the transistor 8.

This results in the reversal of the polarity in the windings of the inductor 10 and the transfer of energy to the capacitor 3 where the energy is stored for subsequent discharge through operation of the pulse source. Thus, in the illustration of FIG. 1 the blocking oscillator will continue to free run providing successive charges to the capacitor 3 between succeeding actuations of the pulse source 7 such that the capacitor 3 is charged to a level sufficient to fire the engine 5.

It is highly desirable in such system to regulate the value to which the capacitor 3 is charged and the present invention is particularly adapted to provide a relatively simple and reliable system for providing a triggered initiation of a blocking oscillator cycle with termination in response to the energy level. This then provides for a single charging of the capacitor 3 to a given level during one cycle of the blocking oscillator.

Thus, referring particularly to FIG. 2, the blocking oscillator circuit and an output circuit similar to that shown in FIG. 1 is illustrated with a positive turn off means to restrict operation of the blocking oscillator to a selected input signal in combination with a modified turn off means for terminating of the blocking oscillator cycle. As a result, corresponding elements in FIGS. 1 and 2 are similarly numbered for simplicity and clarity of explanation.

Referring to FIG. 2, the battery 2 is connected in series with the collector to emitter circuit of an NPN transistor 8 and the current sensing winding 15 of the transformer 13 to charge an energy storage inductor 10. In the illustrated embodiment of the invention in FIG. 2, the storage inductor 10 is somewhat modified to have a single charging winding 27 and a sensing winding 28 with the windings connected to directly transfer the energy stored in the core of the inductor 10 to the capacitor 3 rather than through the separate coupling winding 11 of FIG. 1. The output circuit is essentially identical of that previously described with respect to FIG. 1 except that a common reference line is interconnected between the input of the blocking oscillator circuit and the output circuitry.

In the embodiment of FIG. 2, a control rectifier 29 is connected in series between the base of transistor 8 and the input side of the current feedback winding 16 to positively prevent conduction therethrough as a result of noise or the like. The anode 30 of rectifier 29 is connected to the secondary 16 and the cathode 31 is connected to the base 17. Gate 32 is connected to a special pulse source 33 which simultaneously provides an output through transformer 34 to simultaneously turn on the control rectifier 29 and the output controlled rectifier 6. Thus, the transformer 34 includes a first output winding 35 connected to the gate to cathode circuit of the controlled rectifier 6 and a second output winding 36 connected to the gate to cathode circuit of the rectifier 29. The windings 35 and 36 are polarized to have simultaneous positive ends as illustrated which are connected correspondingly to the gates of the rectifiers to provide a turn on pulse. Each turn on pulse to the rectifier 29 is effective to initiate a cycle of the blocking oscillator for storing energy in the inductor 10. Simultaneously, rectifier 6 discharged the capacitor 3 during the initial portion of the period that the energy is being stored in inductor 10. The capacitor 3 will rapidly discharge and consequently all of the energy will be transferred to fire the appropriate spark plug and the rectifier 6 will reset to open the discharging circuit before the termination of the blocking oscillator charging cycle.

In the particular illustration of FIG. 2, the gate 32 is connected to the appropriate end of the winding 36 and the opposite end thereof is connected directly to the emitter 15. Thus, the input pulse or turn on pulse signal from the pulse source 33 simultaneously provides a turn on pulse to the control rectifier 29 and to the transistor 8 to simultaneously provide a turn on signal to both members. This in turn will result in a current flow from the battery through the collector to emitter circuit of the transistor 8, through the current transformer winding 15 and storage winding 27 to the opposite side of the battery 2. The current transformer 13 will operate in the same mode as previously shown in FIG. 1 to provide a feedback signal which, in FIG. 2, holds the control rectifier 29 on, and drives the transistor 8 into saturation thereby producing an increasing current to the charging winding 27 with a resulting storage of energy in the core of the inductor 10.

The control rectifier 19 is connected across the current transformer 13 in the same manner as shown in FIG. 1 and consequently provides a similar turn off. When the rectifier 19 is triggered to conduct, it bypasses the power of the current transformer from the bias circuit of the transistor 8 including the control rectifier 29 and the base to emitter circuit of the transistor 8. As a result the control rectifier 29 resets to again positively open the circuit to the transistor 8 and preventing recycling of the blocking oscillator until the next subsequent pulse is established by the pulse source 33.

In the embodiment of the invention illustrated in FIG. 2, the sensing winding 28 is connected to provide current to a square loop core unit 36 including a winding 37 connected in series with a pair of resistors 38 and 39 to the opposite sides thereof directly across the sensing winding 28. The gate 22 of the control rectifier 19 is connected to the junction of the resistor 38 and the winding 37. As feedback current increases corresponding to an increasing charging current, a level is reached at which the current through the winding 37 of the square loop core unit saturates the core thereof resulting in a rapid switching action to a low impedance and increasing the voltage signal at the gate 22. This will turn on the rectifier 19 thereby turning off the blocking oscillator in much the same manner previously described with respect to the increasing charge of the capacitor 24 to the firing level. In FIG. 2, a resistor in series with a blocking diode 41 is provided to discharge the energy in the inductor 37 to permit resetting of the circuit in a rapid and reliable response.

Thus, the embodiment of the invention illustrated in FIG. 2 operates essentially in the same manner as shown and described in FIG. 1. In FIG. 2, however, the initiation of a charge of a blocking oscillator charging cycle and the discharge of the capacitors 3 are simultaneously established and both of them are positively controlled by the output of the pulse source 33. Once turned on the blocking oscillator action is essentially similar to that of FIG. 1 with the desired cut off being sensed by the saturable reactor core unit including winding 37 rather than the capacitor charging of FIG. 1.

Various other turn off circuits can, of course, be employed in accordance with the broadest aspect of the present invention. For example, in FIG. 3 a modified cut off circuit is illustrated in which the current flow in the secondary of the current sensing transformer 13 is determined to establish and control cut off. As the circuit may otherwise correspond to the circuit of FIG. 2, only blocking oscillator circuitry and its modifications are illustrated in FIG. 3. Further, corresponding elements of FIGS. 2 and 3 are correspondingly numbered for simplicity and clarity of explanation.

Referring particularly to FIG. 3, the charging transistor 8 interconnects the battery 2 and the transformer 13 in series with the charging winding 42 of the storage inductor 10. In the embodiment of FIG. 3, the storage inductor 10 is wound as a dual winding unit having a charging winding 42 and a separate output winding 43 for coupling the stored energy into a capacitor through the blocking diode 12. The sensing winding of the embodiment shown in FIGS. 1 and 2 is not employed to the embodiment of FIG. 3 as a result of a different novel sensing system employed. Referring to FIG. 3, the controlled rectifier 29 is connected into the base circuit of the transistor 8 with its gate connected to a suitable pulse source, such as shown in FIG. 2. A current sensing resistor 44 is connected between the anode 30 of the rectifier 29 and the winding 16 of the current sensing transformer 13. The voltage across the resistor 44 controls a cut off transistor 45 which directly connects the base connected end of the winding 16 to the battery return or common line. Thus, the transistor 45 includes an emitter connected to the common connection of the resistor 44 and the winding 16 and a collector connected in series with the resistor 48 to the common return line. The base 49 of the transistor 45 is connected directly to the opposite side of the resistor 44 or in series with a reference diode 50 to such point as illustrated. Thus, as the current increases through the resistor 44 the corresponding voltage is applied across the emitter to base junction in series with the diode 50. At a desired voltage the transistor 45 will be biased on. Conduction of the transistor 45 of course effectively grounds the winding 16 and by-passes the regenerative power to the transistor 8 thereby terminating the blocking oscillator cycle. The reference diode 50 provides a stabilizing action to compensate for any variations in temperature as well as establishing a selected turn on voltage in the base to emitter circuit of the transistor 45.

Alternatively, the charging current supplied to the winding 42 can be sensed to by-pass the current transformer and terminate the blocking oscillator cycle for example as shown in FIG. 4 wherein corresponding elements with FIGS. 2 and 3 are correspondingly numbered for simplicity and clarity of explanation. In FIG. 4, the feedback winding 16 of the transformer 13 is connected directly to the anode 30 of the control rectifier 29 and a control rectifier 51 interconnects the common connection of the anode 30 and the winding 17 to ground. When the control rectifier 51 is fired to conduct it will ground the winding 17 thereby terminating the blocking oscillator cycle in the same manner as that described with respect to the turn on of transistor 45 in FIG. 3. A sensing resistor 52 is connected in the common return line between the cathode connection of the control rectifier 51 and the charging winding 42 of the storage inductor 10. The gate 53 of the control rectifier is connected between the resistor 52 and winding 42. Thus, as the current through winding 42 increases, the voltage across the resistor 52 increases until such time as a turn on voltage is established across the gate to cathode circuit of the control rectifier 51. At that point the control rectifier 51 conducts and turns off the charging transistor 8 to thereby terminate the blocking oscillator cycle.

The present invention thus provides a simple and reliable blocking oscillator control circuit employing a current transformer to maintain regenerative action and thereby producing a regenerative action with a minimum of power dissipation. As a result the present invention provides a highly efficient blocking oscillator circuit particularly adapted for charging of a capacitor to a collected energy level in a single cycle of the blocking oscillator.

Various modes of carrying out the invention are contemplated as being within the scope of the following claims, particularly pointing out and distinctly claiming the subject matter which is regarded as the invention.

I claim:

1. A blocking oscillator, comprising
an amplifying stage having an input means,
a storage inductor means having a charging winding,
a current transformer having a primary winding and a secondary winding,
circuit means connecting said amplifying stage in a series circuit with said charging winding and said primary winding,
a feedback circuit means connecting said secondary winding to the input means of said amplifying stage to maintain conduction of said amplifying stage, and
circuit cut off switch means connected to said secondary winding and operatively by-passing said secondary winding from said input means to terminate conduction of said amplifying stage.

2. The blocking oscillator of claim 1 wherein said primary winding of said current transformer is connected between said amplifying stage and said charging winding, and said secondary winding has a first terminal connected between said amplifying stage and said primary winding and a second terminal connected to the input means of said amplifying stage.

3. The blocking oscillator of claim 2 having an electronic switch means connected to said second terminal and to said series circuit to shunt power from said input means.

4. The blocking oscillator of claim 3 wherein said storage inductor unit includes a sensing winding, a current sensitive means is connected across said sensing winding and is connected to energize said electronic switch means to thereby terminate conduction of said amplifying stage.

5. The blocking oscillator of claim 1 wherein said feedback loop includes a triggered rectifier means having an input gate means, a pulse source connected to said gate means and to said amplifying stage to initiate conduction.

6. The blocking oscillator of claim 1 wherein said cut off means includes a triggered rectifier means connected to said secondary winding to shunt the current from said amplifying stage and thereby terminate conduction.

7. The oscillator of claim 1 wherein said feedback loop includes a triggered controlled rectifier means having an input gate means, a pulse source connected to said gate means and to said amplifying stage to initiate conduction and said cut off means includes a triggered controlled rectifier means connected to said secondary winding to shunt the current from said amplifying stage and said rectifier means and thereby terminate conduction and reset said rectifier means.

8. The blocking oscillator of claim 1 wherein the turns ratio of said primary winding to said secondary winding is essentially one to six.

9. The blocking oscillator of claim 1 wherein said primary and secondary windings have a common end connection, and said circuit cut off switch means is a gated rectifier connected across said secondary winding in series with said primary winding, and means responsive to the current level in said charging winding to actuate said gated rectifier and thereby terminating conduction of said amplifying stage.

10. The oscillator of claim 1 wherein said cut off means includes a triggered rectifier means connected to said secondary winding and to the input means of the amplifying stage and to the charging winding, said storage inductor unit having a sensing winding, a current sensitive means connected across said sensing winding and connected to fire said triggered controlled rectifier means and thereby terminate conduction of said amplifying stage.

11. The oscillator of claim 1 wherein said feedback loop includes a triggered controlled rectifier means having an input gate means, a pulse source connected to said gate means and to said amplifying stage to initiate conduction, and said cut off means includes a triggered controlled rectifier means connected to said secondary winding and to the input means of the amplifying stage and to the charging winding, said storage inductor unit having a sensing winding, a current sensitive switch means connected across said sensing winding and connected to fire said triggered controlled rectifier means and thereby terminate conduction of said amplifying stage.

12. The oscillator of claim 1 wherein said feedback loop includes a sensing resistor means connected in series with the secondary winding to said amplifying stage, and said cut off means includes a voltage sensitive switching means connected to said secondary winding to shunt the secondary current from said amplifying stage and having an input means connected across said resistor means to terminate conduction at a selected secondary current.

13. The blocking oscillator of claim 12 having a common return line and wherein said switching means includes transistor means having a first element connected to said secondary winding and said amplifying stage and a second element connected to said return line and having a third element, and a diode connected to said third element and said sensing resistor means to apply the voltage across said input means in series with said diode.

14. The oscillator of claim 1 wherein said cut off means includes a triggered rectifier means connected to said secondary winding and to the input means of the amplifying stage and to the charging winding and having a gate means to initiate conduction therethrough, a sensing resistor means connected in series with the charging winding and connected across the gate means of said triggered controlled rectifier means to terminate conduction at a selected current.

15. The oscillator of claim 1 wherein said amplifying stage includes a transistor having an emitter-collector output means connected in circuit with said charging winding and having a base-emitter input means, said feedback loop includes a first triggered controlled rectifier means having an input gate means, a pulse source connected to said gate means and in series with said base-emitter input means to initiate conduction, said secondary winding being connected in parallel with said controlled rectifier and said base-emitter input means and said cut off means includes a second triggered controlled rectifier means connected between said secondary winding and said charging winding, a sensing resistor connected between said second triggered controlled rectifier means and said charging winding, said second rectifier means having a gate means connected across said sensing resistor to terminate conduction of said amplifying stage at a selected current.

* * * * *

UNITED STATES PATENT OFFICE
CERTIFICATE OF CORRECTION

Patent No. 3,740,589            Dated June 19, 1973

Inventor(s) FLOYD M. MINKS

It is certified that error appears in the above-identified patent and that said Letters Patent are hereby corrected as shown below:

[73] Interest: Application filed under Rule 47

| | | | |
|---|---|---|---|
| Column 8, (Claim 4) | Line 44, | after "inductor" cancel "unit"; | |
| Column 8, (Claim 5) | Line 50, | after "feedback" cancel "loop"; | |
| Column 8, (Claim 6) | Line 55, | after "off" insert --- switch ---; | |
| Column 8, (Claim 7) | Line 60, | cancel "loop" and insert --- circuit means ---; and before "triggered" insert --- first ---; | |
| | Line 63, | before "trig-" insert --- second ---; | |
| | Line 66, | before "rectifier" insert first ---; | |
| Column 9, (Claim 10) | Line 18, | before "rectifier" cancel "controlled"; | |
| Column 9, (Claim 11) | Line 22, | cancel "loop" and insert --- circuit means ---; and before "triggered" insert --- first ---; | |

-1-

UNITED STATES PATENT OFFICE
CERTIFICATE OF CORRECTION

Patent No. 3,740,589  Dated June 19, 1973

Inventor(s) FLOYD M. MINKS

It is certified that error appears in the above-identified patent and that said Letters Patent are hereby corrected as shown below:

Column 9, Line 25, before "trig-" insert --- second ---;
(Claim 11)

Line 31, before "triggered" insert --- second ---

Column 9, Line 35, before "includes" cancel "loop" and insert --- circuit means ---;
(Claim 12)

Column 10, Line 19, before "rectifier" cancel "controlled".
(Claim 14)

Signed and sealed this 29th day of January 1974.

(SEAL)
Attest:

EDWARD M. FLETCHER, JR.
Attesting Officer

RENE D. TEGTMEYER
Acting Commissioner of Patents